US009141903B2

(12) United States Patent
Strat

(10) Patent No.: US 9,141,903 B2
(45) Date of Patent: Sep. 22, 2015

(54) INDICATING ULTRASONIC DATA TAG MOVEMENT

(75) Inventor: Daniella N. Strat, Sound Beach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 863 days.

(21) Appl. No.: 13/418,387

(22) Filed: Mar. 13, 2012

(65) Prior Publication Data

US 2013/0242704 A1 Sep. 19, 2013

(51) Int. Cl.
*G06K 19/00* (2006.01)
*G06K 19/077* (2006.01)

(52) U.S. Cl.
CPC .................. *G06K 19/07749* (2013.01)

(58) Field of Classification Search
CPC ............. H04B 1/03–1/0346; G06K 19/07749
USPC ....................................... 340/568.1
See application file for complete search history.

(56) References Cited

U.S. PATENT DOCUMENTS

| 3,041,021 | A | * | 6/1962 | Jaffe | 244/147 |
|---|---|---|---|---|---|
| 4,854,328 | A | * | 8/1989 | Pollack | 600/549 |
| 5,499,626 | A | * | 3/1996 | Willham et al. | 600/300 |
| 5,725,578 | A | * | 3/1998 | Knapp et al. | 128/898 |
| 5,833,603 | A | | 11/1998 | Kovacs et al. | |
| 5,855,609 | A | * | 1/1999 | Knapp | 128/898 |
| 5,984,875 | A | * | 11/1999 | Brune | 600/549 |
| 7,283,035 | B2 | * | 10/2007 | Tuttle et al. | 340/10.1 |
| 7,746,230 | B2 | * | 6/2010 | Tuttle | 340/572.1 |
| 7,843,350 | B2 | * | 11/2010 | Geissler et al. | 340/573.2 |
| 8,022,826 | B2 | | 9/2011 | Mickle et al. | |
| 2003/0189488 | A1 | * | 10/2003 | Forcier et al. | 340/572.1 |
| 2007/0077959 | A1 | * | 4/2007 | Newman et al. | 455/550.1 |
| 2008/0094207 | A1 | * | 4/2008 | Collins et al. | 340/539.12 |
| 2010/0073188 | A1 | * | 3/2010 | Mickle et al. | 340/825.49 |
| 2011/0095940 | A1 | * | 4/2011 | Breed | 342/146 |
| 2011/0103312 | A1 | * | 5/2011 | Mickle et al. | 370/328 |
| 2011/0215926 | A1 | * | 9/2011 | Goldenberg | 340/568.1 |
| 2013/0033381 | A1 | * | 2/2013 | Breed | 340/568.1 |

OTHER PUBLICATIONS

International Search Report and Written Opinion in counterpart application PCT/US2013/026798 mailed May 22, 2013.

\* cited by examiner

*Primary Examiner* — Luke Ratcliffe
*Assistant Examiner* — Hovhannes Baghdasaryan
(74) *Attorney, Agent, or Firm* — Nong-Qiang Fan

(57) ABSTRACT

Indicating a movement of an ultrasonic tag is accomplished by a transducer operable to provide electrical signals caused by the movement. The movement can cause mechanical vibrations, sound vibrations, or pressure in the transducer, to generate the electrical signals. A controller can detect the electrical signal from the transducer generated by the movement, whereupon the controller obtains tag data and modulates the tag data to be supplied to a powered up emitter. The emitter transmits the modulated tag data in a transmission to an ultrasonic tag reader using an ultrasonic carrier sound wave.

12 Claims, 3 Drawing Sheets

INDICATING ULTRASONIC DATA TAG MOVEMENT

FIELD OF THE DISCLOSURE

The present disclosure relates generally to ultrasonic data tags, and more particularly to the detection of the movement of an ultrasonic tag by an ultrasonic reader.

BACKGROUND

Ultrasonic identification tags can be used to identify and inventory various products labeled with such tags, such as in a retail, factory, or warehouse environment. Ultrasonic identification tags generally transmit data modulated as a sequence of an ultrasonic carrier sound wave. The modulated data includes information, such as a serial number or other identification data, and/or product information, for example. An ultrasonic reader may then receive and demodulate the data from the ultrasonic sound wave, determining a presence of the product and the information about the product.

Typically, an ultrasonic tag is a relatively small device with its own enclosed power source or battery. Of course, producing ultrasonic signals requires power, and continually transmitting ultrasonic signals would quickly drain the battery. One way for the ultrasonic tags to not conserve power is to not keep the transmitting emitter (transponder) powered at all times. When the tag receives an appropriate ultrasonic trigger signal from an ultrasonic reader, the tag responds in kind by powering up its ultrasonic emitter and transmitting its modulated data from the emitter.

A problem arises in the case where a tagged product is moved. The system that inventories these products will not know that the tagged product has been moved until the next time the reader tries to read the tag. Moreover, the reading range of ultrasonic tags is relatively low and, if the product has been moved far enough away, the system will not know where the product is, and will not know which local tag reader to trigger in order to locate the tagged product.

Accordingly, there is a need for a technique for detecting the movement of ultrasonic data tags.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
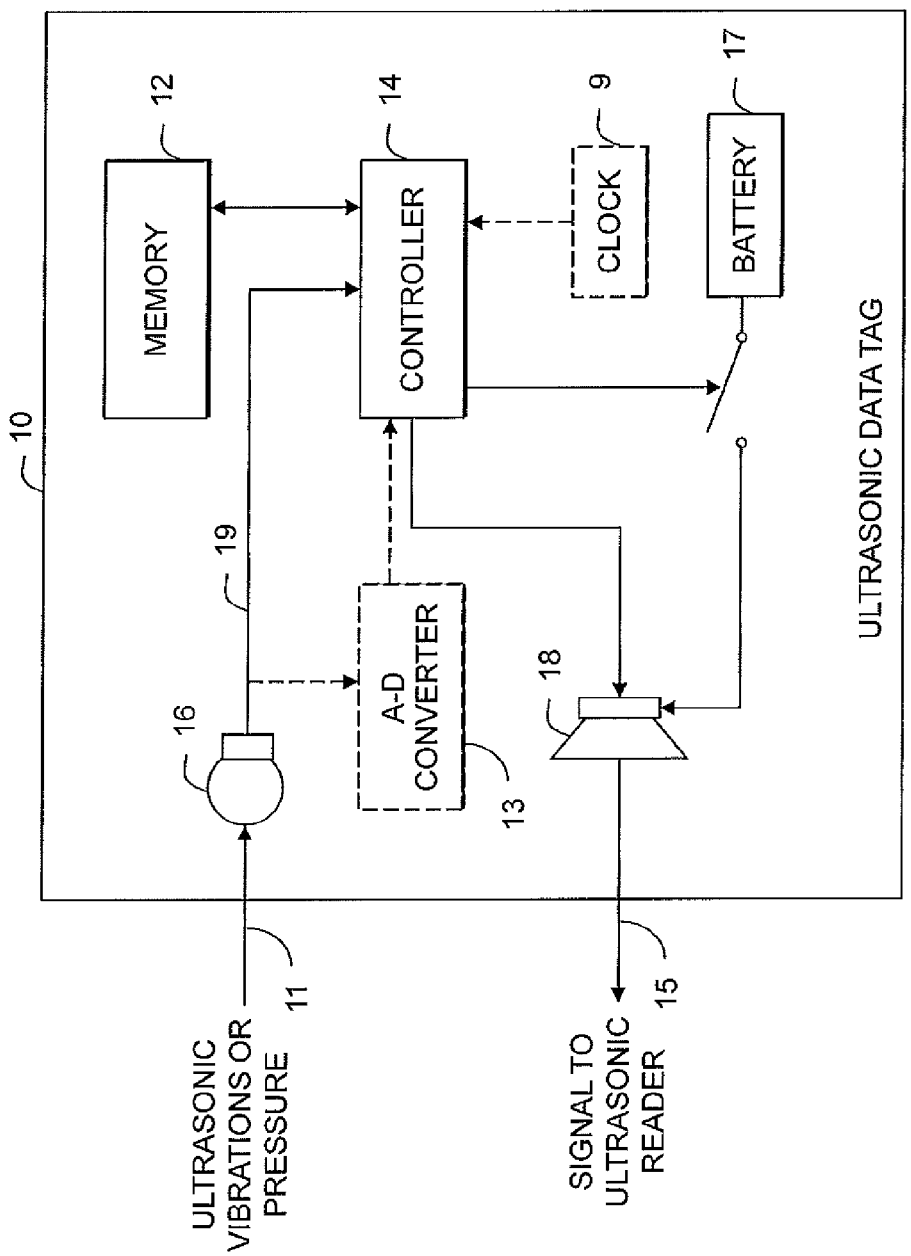
FIG. 1 is a block diagram of an ultrasonic tag, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a technique is described for detecting the movement of ultrasonic data tags by an ultrasonic reader. In particular, the present invention uses the transducer of the ultrasonic tag, which ordinarily listens for a trigger signal from an ultrasonic reader, to also respond to sounds, vibrations, or pressures indicative of movement, whereupon an emitter of the tag can generate a signal indicative of this movement. In effect, the transducer of the tag is used as a sensor for detecting movement of a product or item to which the tag is affixed. Furthermore the same transducer can be used as an energy harvester to recharge the battery in the tag circuit. Specifically, the mechanical vibrations caused by picking up or moving a product affixed with the ultrasonic tag will cause the transducer to generate electrical signals. Similarly, sound vibrations or pressure on the transducer will generate electrical signals indicative of movement. These electrical signals are of a different character than an interrogation signal from a reader, and can be detected by a controller circuit of the tag, whereupon the controller circuit will power up the emitter to begin transmitting tag identity data or other movement codes stored in the tag. In as much as the reader is receiving tag data that it did not request from that particular tag, the reader will then know something else has triggered the tag to send a response, i.e. that the tag is being moved. The tag circuit can be latent (i.e. unpowered) until the first signal is received thus conserving energy and reducing noise.

Optionally, the controller circuit of the tag could be imbued with enough intelligence to discriminate between random electrical signals caused by tag movement and the specific electrical trigger signals caused by an interrogation trigger from the reader. In this case, the controller can change the character of the emitted data such that the reader will know that the tag is either subject to movement or is responding to a trigger signal. For example, the typical response of a tag to a trigger signal is to send one instance of the stored tag identity data. Whereas, the controller could instead transmit a special movement code to the reader in response to the detection of tag movement. The above scenarios can be accomplished using a passive ultrasonic tag configuration.

Alternatively, for an active ultrasonic tag the controller circuit could repeatedly transmit the tag data or movement code all of the time while the tag is subject to movement, thereby allowing the system to track the tag in real time. In this case, the tag will continue to emit until the state of the motion is changed by that item being placed back on the shelf, the tag is deactivated by the product being purchased, the tag is discarded, or the tag receives a subsequent trigger signal, for example.

It is envisioned that a tag configuration can be powered in different ways. In one configuration, a Radio Frequency Identification (RFID) antenna that is co-disposed with the ultrasonic tag can charge up a battery or capacitor upon receiving an RFID interrogation signal. In another configuration a battery can be printed on the same ultrasonic tag. In yet another embodiment, power can be recovered from the transducer and/or emitter electrical signals, and can be used to recharge a battery (or capacitor), or can be used in real time to generate a modulated ultrasonic signal, similar to the techniques used to power RFID tags.

FIG. 1 is a block diagram of an ultrasonic data tag 10, in accordance with the present invention. The ultrasonic tag 10 includes a transducer such as an ultrasonic microphone 16 that can respond to an ultrasonic sound pressure wave or an applied pressure 11 to provide electrical signals 19 to a controller 14. The tag also includes a transponder such as a speaker or emitter 18 that transmits data 15 relating to the ultrasonic tag on a modulated ultrasonic sound pressure wave. The transducer and emitter can be the same element depending on the sensitivity of the element. The data can be stored in a logic element or memory 12 and can include, for example, a serial number, product information, or any other suitable data, and can include an optional movement code in accordance with the present invention, and as will be detailed below. The data can be retrieved by the controller and modulated according to any known modulation scheme, such as a frequency or time based modulation schemes. The controller can power up the emitter by switching in a power source such as rectified signals recovered from the transducer or emitter, a capacitor, or a rechargeable or pre-charged battery, all herein referred to as battery 17. The controller can then send the modulated sequence of the data to the emitter to be emitted as an ultrasonic carrier wave signal 15 to an ultrasonic reader.

The transducer 16 is operable to detect ultrasonic sound waves, mechanical vibrations due to movement, or pressure applied to it. The transducer can be a separate element from the emitter 18 (as shown) or the transducer and emitter can be the same element (not shown) given a suitable sensitivity. The transducer 16 can be configured to receive specific ultrasonic trigger sound waves of a specific modulation from an ultrasonic reader, and provide the electrical equivalent trigger to the controller 14. Upon recognizing this trigger, the controller will retrieve specific data from a logic element or memory 12 to provide an associated response back to the reader. However, in accordance with the present invention, the transducer 16 is also configured to generate an electrical signal upon being subjected to sound and/or mechanical vibrations 11 caused by movement, or pressure directly applied to the transducer, i.e. the transducer of the tag is used to detect movement.

Typically, the transducer is a piezoelectric device configured to be most sensitive to ultrasonic sound waves from an ultrasonic reader. In accordance with the present invention, the piezoelectric device can be enhanced to detect sound, vibration, or pressure indicative of movement. For example, the transducer could be configured to not only detect ultrasonic sound waves, but also to detect a broader spectrum of frequencies (i.e. lower frequencies) that are more indicative of movement. In addition, the tag can be enhanced with calibrated weight(s) to amplify the movement signal exciting the transducer. For example, a weight affixed to the tag, or to a product to which the tag is affixed, may cause sound or movement of its own when the tag is moved, which can add to the signal detected by the transducer. As a result, it is envisioned that various movements or pressures will be detected by the transducer and controller. For example, a positive indication of movement can be generated where the tag is moved, crushed, bent, torn, ripped off the merchandise, replaced with another tag, written over with writing instrument (subject to direct pressure), placed in a sound rich area (of either a loud sound or ultrasound), vibrated, etc.

The controller 14 is coupled to the transducer 16 and is operable to detect the electrical signal from the transducer generated by the movement. A memory 12 is coupled to the controller and includes data to be read by the controller when the electrical signal is detected by the controller. For example, upon receiving a specific interrogation trigger signal from an ultrasonic reader the tag can produce a specific tag identity data from the memory that is sent back to the reader. In addition, and in accordance with the present invention, upon detecting a movement of the tag, the tag can either retrieve the same specific tag identity data as is used for an interrogation trigger, and/or a specific movement code, that is sent back to the reader.

In particular, upon the controller detecting the electrical signal due to movement, the emitter 18 is powered up and receives the modulated data from the controller for transmission to an ultrasonic tag reader using an ultrasonic carrier sound wave 15. The data can include the tag identity data, and/or the specialized movement code. If a reader receives tag identity data without sending a previous interrogation trigger, it can be assumed that the tag is detecting and reporting movement. Alternatively, if the controller 14 has enough intelligence to discriminate between random movement signals and the specific ultrasonic interrogation trigger from the reader, the movement code can be sent to the reader to provide direct evidence of tag movement. The movement code can be a single code, or can be different codes indicative of different types of movement being experienced by the tag. For example, the controller may have enough intelligence to recognize the sound spectrums for different identified modes of movement.

The tag can respond to a movement indication by sending one instance of either the tag identity data and/or the movement code, as described above. Alternatively, an active tag could repeatedly transmit the tag identity data or movement code all of the time while movement is being detected, thereby allowing the system to track the tag in real time. In this case, the tag will emit its response signal 15 repeatedly until the state of the motion is changed by that item being placed back on the shelf, the tag is deactivated when the product is purchased, the tag is discarded, or the tag receives a subsequent trigger signal. Due to the power required for continual transmissions in an active tag configuration, a larger battery or power sources is needed over that of a passive tag configuration.

Upon the reader interpreting the response signal 15 from the tag as an indication of the tag's movement, several actions could be performed to track the movement of the tag and determine its fate. For example, if multiple ultrasonic readers of known locations are able to receive the repeated transmissions from the tag, the received timing of these transmissions can be used to track the location of the tag in real time using triangulation, trilateration, or other suitable locationing technique. Alternatively, if the tag stops its motion and the reader receives a signal from the tag of an equivalent strength of the tag before it was moved, it can be assumed that the tagged product was replaced in the same location. Conversely, if the reader no longer receives a signal from that tag, it can be assumed that the tagged product was removed from that location.

In practice, besides simply detecting movement, the present invention can be used for other applications. In one scenario, the tag can be used as a real time counter when attached to product, where the tag can count how many times an item has been touched (disturbed), such as for highly sensitive materials applications, for example. In this scenario, the controller 14 can increment a counter in the memory 12 every time the transducer detects and the controller recognizes electrical signals due to movement to record the number of movements to which the tag has been subjected.

In another scenario, the signal produced by the transducer can be further analyzed by the controller to give information about the amplitude of the movement, in order to detect whether a product was dropped, abused, or vibrated, which would make the present invention a good candidate for test equipment, warranty verification, security, etc. In this scenario, an analog-to-digital converter 13 is coupled to the transducer and can provide a measurement of an amplitude of the electrical signals to the controller. The controller can compare the measured amplitude from the converter 13 to a previously stored amplitude in the memory 12, and store the larger of the two amplitudes in the memory to record the worst amplitude to which the tag has been subjected.

In another scenario, the signal produced by the transducer can be further analyzed to give information about the amplitude of the movement and an amount of time that the tag was vibrated, to detect whether a product was vibrated for too long, which would also make the present invention a good candidate for test equipment, warranty verification, security, etc. In this scenario, a clock 9 can provide a measurement of a period of time that the tag is subject to a particular amplitude of electrical signals to the controller. The controller can compare the period of time to a previously stored period of time in the memory 12, and store the larger of the two periods of time in the memory to record the worst vibration to which the tag has been subjected.

Figure 2:
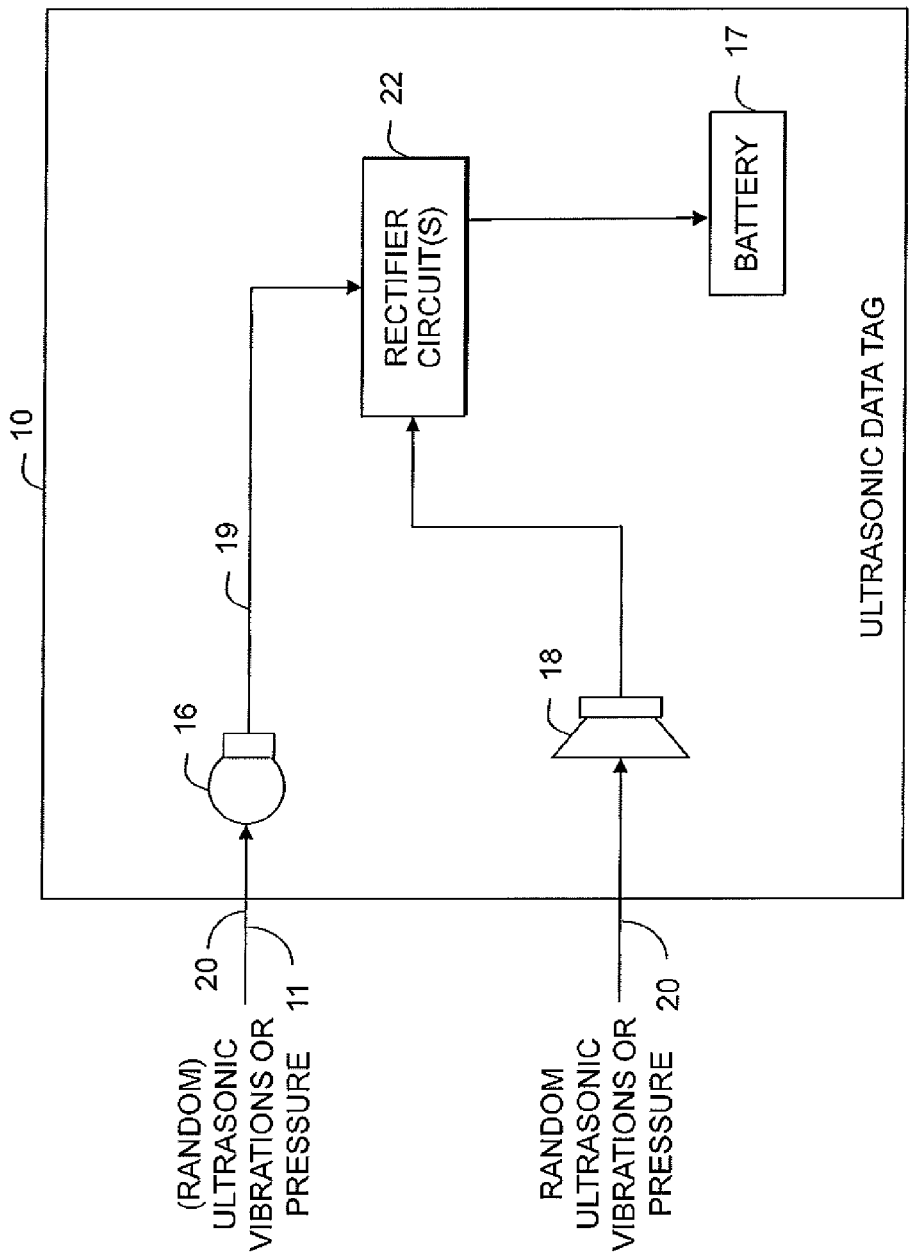
FIG. 2 is a diagram illustrating a method of indicating the movement of an ultrasonic tag, in accordance with some embodiments of the present invention.

In yet another scenario, referring to FIG. 2, the transducer 16 and/or the emitter 18 can be connected to one or more rectifier circuits coupled to a battery 17 of the tag, so these elements can be used to re-charge the battery when exposed to vibrations, pressure, sound, and repetitive mechanical motion 20. The battery 17 could also be charged during the reception of desired signals 11. Although the emitter is normally an output device it's piezoelectric element can still function as an input charging element when the emitter is not being used to output signals from the controller (14 of FIG. 1). Inasmuch as these elements convert mechanical movement (vibration) to electrical energy, this electrical energy can be used to recharge the connected battery. In this way the present invention can work in many ways to either save energy or replenish energy in a circuit, either during active use of the tag, or passively when the tag is not being used.

In practice, upon detecting movement, the present invention can be used for other applications. For example, in any of the above scenarios, the indication of movement received by the reader can be used to initiate an external activity by the reader when the movement is first detected. Moreover, different movement codes can be used to trigger different external activities. The external activity can be: alerting an ultrasonic locating system to track tagged merchandise while in movement; alerting a video camera to concentrate (zoom in) on the location of movement; alarm, shut down or turn on the reader system that is monitoring the tag; triggering an RFID system; or trigger some task of reading parameters of an environment where the tag is being used—temperature, noise level, humidity, chemical content, etc.

There are several environments where the ultrasonic tag of the present invention can be used. For example, a tag can be affixed to medical supplies, where the movement of affixing the tag or unsealing the supplies to affix the tag can trigger a temperature monitor to measure the medical supplies temperature during transport, as well as the accelerations they are exposed to. A customer can pick an item from the shelf, whereupon the tag wakes up and emits ultrasound messages all that way to the cash register where it is deactivated, or to "activity ceased" status if the item is dropped somewhere else, thereby providing real time inventory and security in one system. A buyer can return an (expensive) item due its to failure to work properly, where the tag (inside the item) registered a "drop" of the item, such that the buyer return can be denied due to abuse. This same situation can occur during shipping of the item from the manufacturer to the store. The tag can be used as a sound/movement sensitive alarm system to detect any kind of break-in, item removal, item displaced, item damaged, etc. Depending upon how it is programmed, the tag can either log the information or emit a sequence of ultrasounds that can be identified by a reader.

Breaking a tag off the merchandise would alert a reader that can direct a camera to concentrate on observing the activity at that location and alert store security to enhanced real time security.

In addition, recognizable sounds within the tag area may be able to "wake-up" the tag and "program" its features to identify itself based on the level of activity in the store, such as an identity signal for every two, ten, or sixty minutes or to shut off systems when there is no noise, such as during the night in order to conserve energy. In this way, the tag can be employed as a "switch" to shut-off or turn-on entire networks based on store noise or movement activity, i.e. detecting noise within the store, or placing the tag on a door to detect motion or inactivity.

Figure 3:
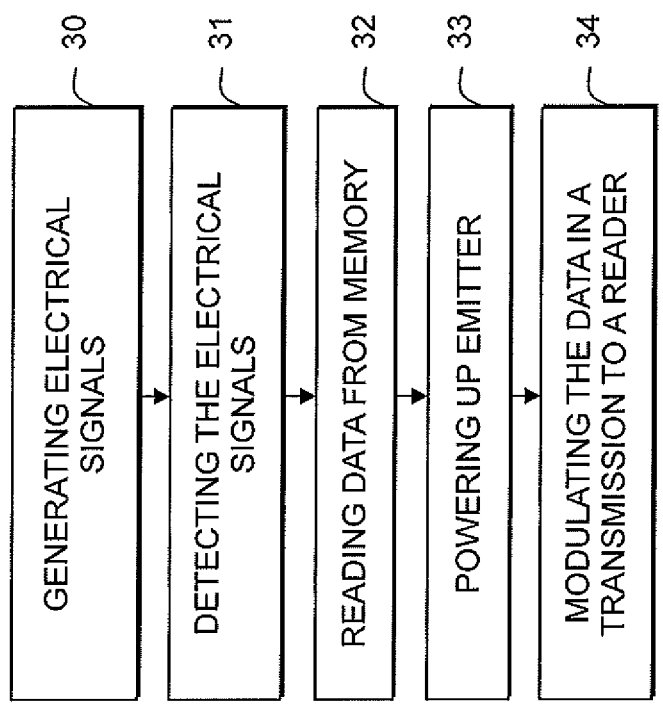

FIG. 3 is a diagram illustrating a method for indicating a movement of an ultrasonic data tag, according to one embodiment.

A first step 30 includes generating an electrical signal by a transducer upon being subjected to movement or handling of the tag or a product to which the tag is affixed.

A next step 31 includes detecting the electrical signal from the transducer generated by the movement.

A next step 32 includes reading data from a memory upon detecting the electrical signal. The data in the memory can include tag identity data to be used in response to an ultrasonic trigger from the ultrasonic tag reader or movement of the tag. The data in the memory can also include a movement code to be used in response to the electrical signal from movement.

A next step 33 includes powering up an emitter.

A next step 34 includes modulating the data by the controller for the emitter for a transmission to an ultrasonic tag reader using a sequence of an ultrasonic carrier sound wave. The data that is transmitted can be either or both of the tag identity data and the movement code. The data can be transmitted once or repeatedly until either the transducer is no longer subject to movement, the tag is deactivated, or upon receipt of a subsequent trigger signal from the ultrasonic reader.

An optional step is to initiate an external activity via the ultrasonic reader reading the movement code.

Another optional step is to increment a counter in the memory every time the controller receives electrical signals. This can record how many times the tagged product has been moved or abused.

Another optional step is to measure the amplitude of different occurrences of the electrical signals to find the maximum amplitude, which is stored. This can record how violently the tagged product has been treated.

Another optional step is to measure the periods of time of different occurrences of the electrical signals to find the maximum period of vibrational time, which is stored. This can also record how violently the tagged product has been treated.

Advantageously, the present invention provides ultrasonic system where the tags emit an ultrasound sequence and can be tracked while in transit. The technique described herein to wake-up the tag would allow the tags to be passive until they are picked up, thus conserving battery power. The ability to wake up the tag in transit allows for tags to be tracked in real time, helping with locationing, theft prevention, security, etc. In addition, if a location or presence of an active tag is already known to the reader system, the present invention conserves battery power by not activating the tag until a movement occurs.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An ultrasonic data tag operable to provide an indication of movement, the ultrasonic data tag comprising:
    a transducer operable to generate an electrical signal upon being subjected to movement, wherein the electrical signal is produced by sound vibrations of the transducer due to movement of the tag;
    a controller coupled to the transducer, the controller operable to detect the electrical signal from the transducer generated by the movement;
    a memory coupled to the controller, the memory including data to be read by the controller when the electrical signal is detected by the controller, and wherein the data in the memory includes tag identity data to be used in response to an ultrasonic trigger from the ultrasonic tag reader; and
    an emitter coupled to the controller, wherein upon the controller detecting the electrical signal, the emitter is powered up and receives modulated data from the controller for transmission to an ultrasonic tag reader using an ultrasonic carrier sound wave, and wherein the data transmitted by the emitter includes the tag identity data.

2. The ultrasonic data tag of claim 1, wherein data in the memory includes at least one movement code to be used in response to the electrical signal produced from the movement, and wherein the data transmitted by the emitter in response to the movement is the at least one movement code.

3. The ultrasonic data tag of claim 2, wherein the at least one movement code is used to initiate an external activity via the ultrasonic reader reading the movement code.

4. The ultrasonic data tag of claim 1, further comprising a battery, wherein the emitter is powered by the battery and transmits the data repeatedly until the transducer is no longer subject to movement.

5. The ultrasonic data tag of claim 1, further comprising a battery, wherein the emitter is powered by the battery, and wherein the emitter transmits the data repeatedly until the tag is deactivated.

6. The ultrasonic data tag of claim 1, further comprising a battery, wherein the emitter is powered by the battery, and wherein the emitter transmits the data repeatedly until the tag receives a subsequent trigger signal from the ultrasonic reader.

7. The ultrasonic data tag of claim 1, wherein the controller is further operable to increment a counter in the memory every time it receives the electrical signals.

8. The ultrasonic data tag of claim 1, further comprising a clock coupled to the controller, wherein the clock provides a measurement of period of time when the tag was moved, and wherein the controller is further operable to compare the period of time to a previously stored period of time in the memory, and wherein the controller will store the larger period of time in the memory.

9. The ultrasonic data tag of claim 1, further comprising a battery.

10. An ultrasonic data tag operable to provide an indication of movement, the ultrasonic data tag comprising:
   a transducer operable to generate an electrical signal upon being subjected to movement;
   a controller coupled to the transducer, the controller operable to detect the electrical signal from the transducer generated by the movement;
   a memory coupled to the controller, the memory including data to be read by the controller when the electrical signal is detected by the controller; and
   an emitter coupled to the controller, wherein upon the controller detecting the electrical signal, the emitter is powered up and receives modulated data from the controller for transmission to an ultrasonic tag reader using an ultrasonic carrier sound wave; and
   an analog-to-digital converter coupled to the transducer, wherein the analog-to-digital converter provides a measurement of an amplitude of the electrical signals to the controller, and wherein the controller is further operable to compare the measured amplitude to a previously stored amplitude in the memory, and wherein the controller will store the larger amplitude in the memory.

11. An ultrasonic data tag operable to provide an indication of movement, the ultrasonic data tag comprising:
   a transducer operable to generate an electrical signal upon being subjected to sound vibrations of the transducer due to movement of the tag;
   a controller coupled to the transducer, the controller operable to detect the electrical signal from the transducer generated by the movement;
   a memory coupled to the controller, the memory including data to be read by the controller when the electrical signal is detected by the controller, and wherein the data in the memory includes tag identity data to be used in response to an ultrasonic trigger from the ultrasonic tag reader;
   a battery controller by the controller; and
   an emitter coupled to the controller, wherein upon the controller detecting the electrical signal, the emitter is powered up by the battery and receives modulated data from the controller for transmission to an ultrasonic tag reader using an ultrasonic carrier sound wave, and wherein the data transmitted by the emitter includes the tag identity data.

12. A method for indicating a movement of an ultrasonic data tag, the method comprising the steps of:
   generating an electrical signal by a transducer upon being subjected sound vibrations of the transducer due to movement of the tag;
   detecting the electrical signal from the transducer generated by the movement;
   reading data from a memory upon detecting the electrical signal, and wherein the data in the memory includes tag identity data to be used in response to an ultrasonic trigger from the ultrasonic tag reader;
   powering up an emitter; and
   modulating the data in a transmission to an ultrasonic tag reader using an ultrasonic carrier sound wave, and wherein the data transmitted by the emitter includes the tag identity data.

* * * * *